Aug. 18, 1931.  H. L. DUNCAN  1,819,743
MECHANISM FOR AUTOMATICALLY AND SYNCHRONOUSLY ADJUSTING THE IGNITION AND
VALVE MECHANISM OF INTERNAL COMBUSTION ENGINES FOR SPEED AND POWER
Filed Oct. 26, 1928  3 Sheets-Sheet 1
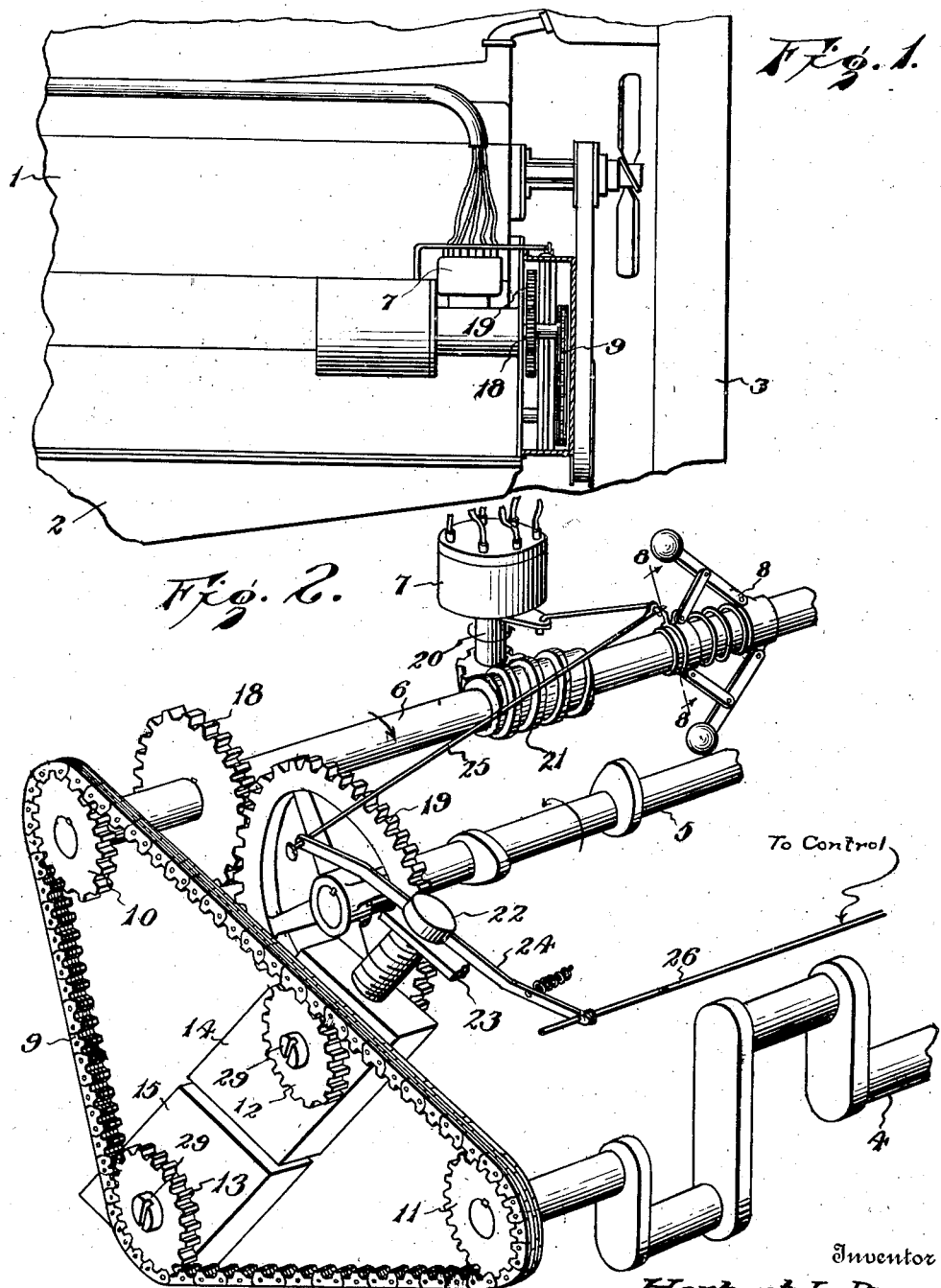
Inventor
Herbert L. Duncan

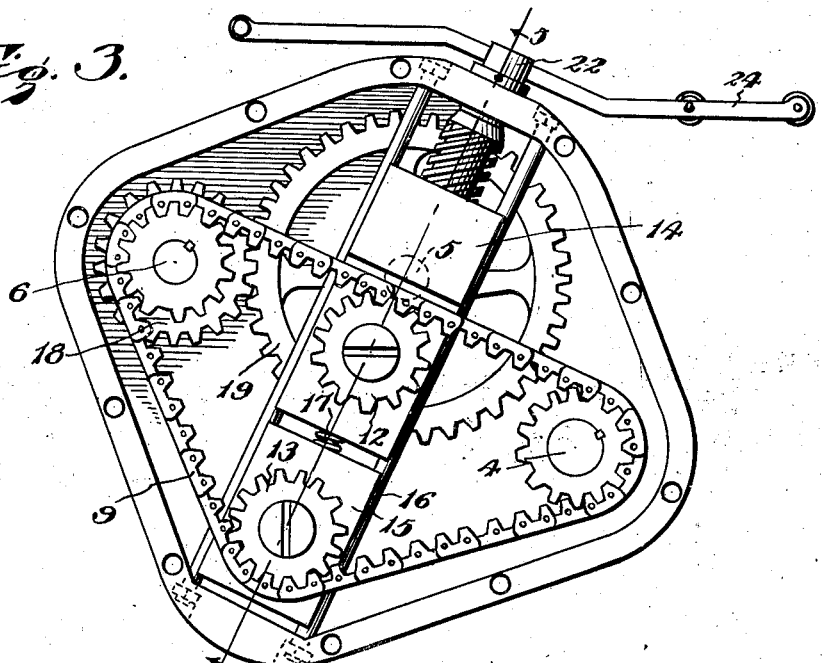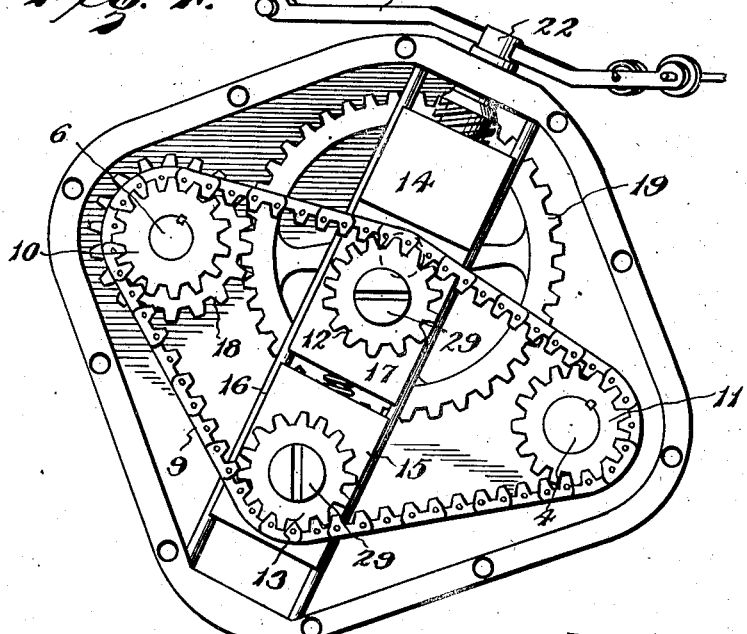

Aug. 18, 1931.   H. L. DUNCAN   1,819,743
MECHANISM FOR AUTOMATICALLY AND SYNCHRONOUSLY ADJUSTING THE IGNITION AND
VALVE MECHANISM OF INTERNAL COMBUSTION ENGINES FOR SPEED AND POWER
Filed Oct. 26, 1928   3 Sheets-Sheet 3
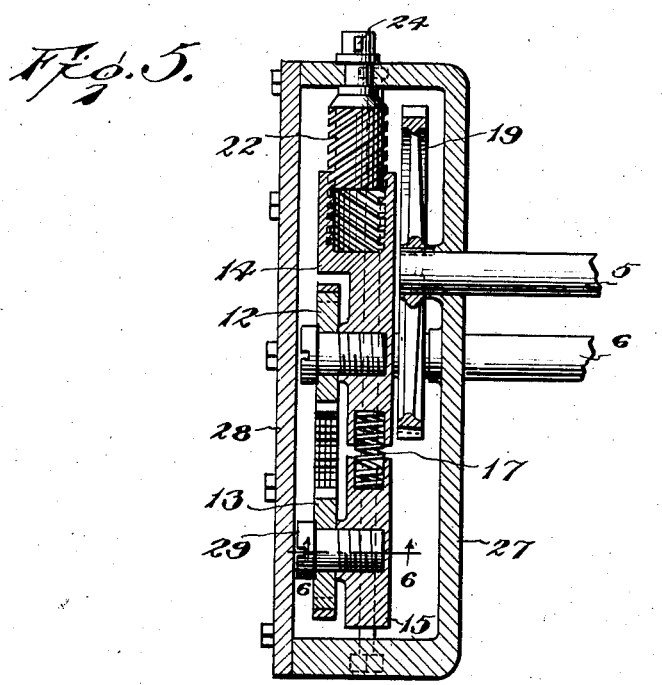
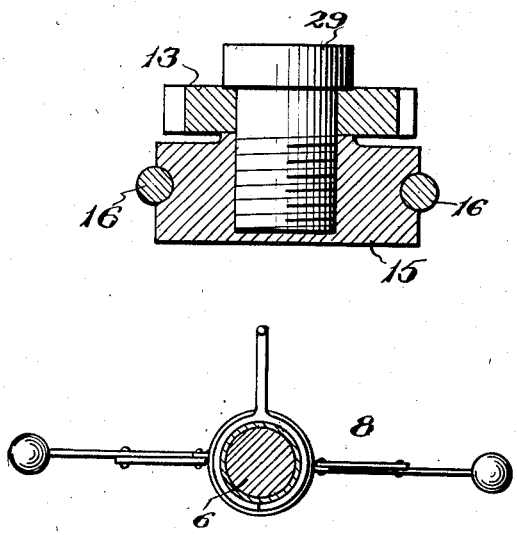
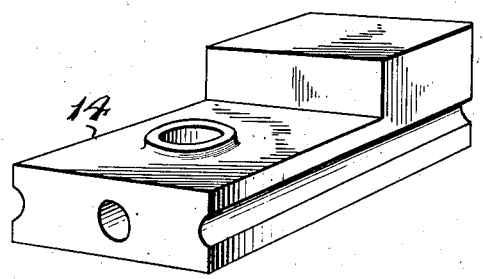
Inventor
Herbert L. Duncan
By Lacey & Lacey, Attorneys

Patented Aug. 18, 1931

1,819,743

UNITED STATES PATENT OFFICE

HERBERT L. DUNCAN, OF HIGHLAND PARK, MICHIGAN, ASSIGNOR OF ONE-HALF TO LEWIS P. THRELKELD, OF HIGHLAND PARK, MICHIGAN

MECHANISM FOR AUTOMATICALLY AND SYNCHRONOUSLY ADJUSTING THE IGNITION AND VALVE MECHANISM OF INTERNAL COMBUSTION ENGINES FOR SPEED AND POWER

Application filed October 26, 1928. Serial No. 315,227.

The invention relates to an improved mechanism for automatically varying both the ignition and valve timing of an internal combustion engine in relation to the speed of the motor.

So far as advised the relative movement between the crank shaft, the cam shaft and the timer shaft of internal combustion engines, is fixed. In consequence the engine is not flexible and does not adapt itself to change of speeds and readily heats, fouls and tends to vibrate.

The present invention provides connecting means between the throttle control, the ignition drive and the cam shaft, whereby these parts may be synchronously adjusted independently of the crank shaft which is the prime actuator from which the timer and cam shaft derive movement when the engine is running.

The invention aims to automatically and synchronously adjust the ignition and valve mechanism for advancing or retarding their action in conformity to increase or decrease in the speed of the engine, thereby resulting in the provision of a flexible engine which will not heat, vibrate or foul from accumulation of carbon, and which will conserve fuel, run smooth, develop maximum power and respond quickly to adjustment of the throttle for accelerating or retarding the speed.

The invention moreover contemplates a train of gearing between the various shafts of the ignition and valve mechanisms including a chain drive, and means for adjusting the chain drive to effect a synchronous adjustment of the ignition and valve mechanisms, whereby they may be advanced or retarded according to the speed of the motor.

The invention also provides means for maintaining the drive chain under predetermined tension at all stages of adjustment, thereby preventing any back lash or lost movement from wear or other cause.

While the drawings illustrate preferred embodiments of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which:—

Figure 1 is a side view of a portion of an internal combustion engine illustrating an embodiment of the invention.

Figure 2 is a schematic view in perspective.

Figure 3 is an enlarged view showing the chain drive connecting the crank and timer shafts.

Figure 4 is a view similar to Figure 3 showing the active run of the drive chain deflected and the ignition and valve mechanisms advanced.

Figure 5 is a detail sectional view on the line 5—5 of Figure 3 looking in the direction of the arrows.

Figure 6 is a detail sectional view on the line 6—6 of Figure 5.

Figure 7 is a detail perspective view of the member of the mount for the idlers by which positive movement is imparted for deflecting the active run of the drive chain.

Figure 8 is an enlarged sectional view of the timer shaft on the line 8—8 of Figure 2 showing the governor thereon.

Corresponding and like parts are referred to in the following description and designated in the several views of the drawings by like reference characters.

Referring to Figure 1 of the drawings the numeral 1 denotes the engine block, 2 the crank case and 3 the radiator of an internal combustion engine of conventional type. On reference to Figure 2 of the drawings the numeral 4 designates the crank shaft, 5 the cam shaft, 6 the timer shaft, 7 the timer and 8 a governor for automatically advancing and retarding the ignition and valve mechanism as the engine is accelerated or retarded when running. The aforementioned parts may be of any well known construction and arrangement and are illustrated to demonstrate the application of the invention which resides in means for independently and automatically adjusting the ignition and valve mechanisms to augment the power at low speed and obtain unlimited high speed without overheating of the engine or producing appreciable vibration.

In accordance with the invention a drive chain 9 is trained about spur gears 10 and 11 and intermediate idlers 12 and 13. The spur gear 10 is fast to the timer shaft 6 and the spur gear 11 is fast to the crank shaft 4. The idlers 12 and 13 are supported upon a mount comprising independent members 14 and 15. This mount is slidably supported upon guides 16 which may be of any determinate construction and arrangement. The members 14 and 15 consist of blocks and are normally pressed apart by means of an interposed spring 17 so as to maintain a uniform tension upon the active and the idle runs of the drive chain. A spur gear 18 fast to the timer shaft 6 is in mesh with a spur gear 19 fast to the cam shaft 5. As a result both shafts 5 and 6 rotate in unison. The drive gearing and associated parts may be conveniently located according to the design and make of engine. In Figure 1, of the drawings, the drive gearing is shown disposed in front of the engine in the accustomed position, but it is obvious that it may be arranged in any preferred location. The rotor shaft 20 of the timer 7 is geared to the shaft 6, as indicated at 21, in Figure 2.

When the parts are assembled the active run of the drive chain 9 is straight, as indicated in Figures 2 and 3 of the drawings, and the idle run is deflected. When the active run of the drive chain 9 is deflected from a straight line it tends to turn the spur gears 10 and 11, but since the crank shaft offers a greater resistance to rotation than the shaft 6 it follows that the spur gear 10 has a rotary movement imparted thereto which effects a positive rotation of the shafts 6 and 5 and the consequent advancement of the ignition and valve mechanisms. In the arrangement shown positive movement is imparted to the member 14 of the sectional idler mount. An adjusting screw 22 mounted in a part 23 of the frame is threaded into an opening formed in the member 14, the pitch of the screw thread being such that a partial rotation of the adjusting screw 22 will effect a movement of the member 14 to cause a deflection of the active run of the drive chain, as indicated most clearly in Figure 4 of the drawings, to positively advance the ignition and valve mechanisms in proper relation to the stroke of the pistons, with the result that unlimited high speed is attained without overheating of the engine or the waste of fuel. A lever 24 is fast to the adjusting screw 22 and is adapted to be connected to the governor mechanism by means of a rod 25 and to the throttle control means of a rod 26 so that the adjustment may be automatic as well as manual. The numeral 27 designates a housing for the drive gearing and associated parts. A cover plate 28 closes the housing 27 and provides for ready access thereto for any desired purpose. The idlers 12 and 13 are mounted upon stud bolts 29 threaded into the respective members 14 and 15 forming part of the mount.

In practice, the active run of the drive chain is straight when the engine is running at a normal speed or idling, but when the engine picks up and the speed increases the invention is brought into play to proportionately advance the ignition and valve mechanisms to operate with relation to the stroke of the pistons with the result that unlimited speed is attained, the engine made more flexible, vibration overcome, a saving of fuel effected and the engine caused to run smoothly, with an increase of power at low speed and without any tendency to heat.

While I have shown and described a screw for raising and lowering the drive chain it will, of course, be understood that a cam or any other mechanical means may be used with good results and I, therefore, do not desire to limit myself in this respect. It will also be understood that the device may be constructed as a part of the standard equipment of an engine or used as an attachment and may be positioned either at the front, rear or any other desired portion of the engine. It will furthermore be understood that the arrangement of gearing and drive chain as well as the actuating lever may be varied as may be found desirable or necessary in the actual operation of the device.

Having thus described the invention, I claim:—

1. In an internal combustion engine, the combination with a timer shaft, a cam shaft, a crank shaft, and an endless drive chain between said shafts, of an idler associated with a run of the drive chain, and an expansible sectional mount carrying said idler on one section thereof for actuating said idler to deflect said run of the drive chain and effect advancement or retarding of the timer and cam shafts with respect to the crank shaft.

2. In an internal combustion engine, the combination with a timer shaft, a cam shaft, a crank shaft, and an endless drive chain between said shafts, of an idler, a mount therefore, the mount being adjustable for shifting said idler, an adjusting screw in threaded engagement with the mount and operable for adjusting the mount, and means for operating said screw for adjusting the mount and shifting said idler to deflect the drive chain for advancing or retarding the timer and cam shafts with respect to the crank shaft.

3. In an internal combustion engine, the combination with a timer shaft, a cam shaft, a crank shaft, and an endless chain between said shafts, of a sectional mount, yieldable means normally urging the sections of the mount apart, idlers carried by said sections and engaging the runs of the drive chain, and means for shifting one of the sections of the mount to deflect a run of the drive chain and effect advancement or retarding of the timer and cam shafts with respect to the crank shaft.

4. In an internal combustion engine, intake and exhaust valves, ignition mechanism, a crank shaft, adjustable means operable by said shaft for actuating the valves and said mechanism, an adjustable throttle, and means for adjusting said first mentioned means for advancing or retarding the timing of the ignition and valve action simultaneously with adjustment of the throttle.

In testimony whereof I affix my signature.

HERBERT L. DUNCAN. [L. S.]